(12) United States Patent
Shi et al.

(10) Patent No.: US 11,425,663 B2
(45) Date of Patent: Aug. 23, 2022

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/902,525

(22) Filed: Jun. 16, 2020

(65) Prior Publication Data
US 2020/0314768 A1   Oct. 1, 2020

Related U.S. Application Data

(63) Continuation of application No. PCT/CN2017/120125, filed on Dec. 29, 2017.

(51) Int. Cl.
| | | |
|---|---|---|
| H04W 52/32 | (2009.01) | |
| H04L 5/00 | (2006.01) | |
| H04W 52/14 | (2009.01) | |
| H04W 52/34 | (2009.01) | |
| H04W 52/36 | (2009.01) | |

(52) U.S. Cl.
CPC ......... *H04W 52/325* (2013.01); *H04L 5/0057* (2013.01); *H04W 52/14* (2013.01); *H04W 52/34* (2013.01); *H04W 52/367* (2013.01)

(58) Field of Classification Search
CPC ............. H04W 52/30; H04W 72/0413; H04W 72/0453; H04W 52/325; H04W 52/14;
(Continued)

(56) References Cited

U.S. PATENT DOCUMENTS

| 10,560,947 B2* | 2/2020 | Yang ................. H04L 5/001 |
| 10,925,040 B2* | 2/2021 | Zhou ................. H04L 5/005 |

(Continued)

FOREIGN PATENT DOCUMENTS

| CN | 102427608 A | 4/2012 |
| CN | 103369654 A | 10/2013 |

(Continued)

OTHER PUBLICATIONS

3GPP TSG RAN WG1 Meeting #91; Reno, Nevada, USA, Nov. 27-Dec. 1, 2017; R1-1720897.
(Continued)

*Primary Examiner* — John J Lee
(74) *Attorney, Agent, or Firm* — Young Basile Hanlon & MacFarlane, P.C.

(57) ABSTRACT

Implementations of the present disclosure provide a wireless communication method and devices. The method comprises: a terminal device obtains maximum sending power and/or transmit power control (TPC) information corresponding to each sounding reference signal (SRS) resource set in at least one SRS resource set; and sends an SRS by using SRS resources in each SRS resource set on the basis of the maximum sending power and/or TPC information corresponding to each SRS resource set.

18 Claims, 4 Drawing Sheets

(58) Field of Classification Search
CPC .. H04W 52/34; H04W 52/367; H04L 5/0007; H04L 5/001; H04L 5/0057
USPC ............................. 455/522, 69, 452.1, 509
See application file for complete search history.

(56) References Cited

U.S. PATENT DOCUMENTS

| | | | |
|---|---|---|---|
| 2016/0135128 A1 | 5/2016 | Lee et al. | |
| 2019/0190747 A1* | 6/2019 | Park | H04W 52/24 |
| 2019/0268971 A1* | 8/2019 | Talarico | H04W 88/06 |
| 2019/0349864 A1* | 11/2019 | Zhang | H04B 7/088 |

FOREIGN PATENT DOCUMENTS

| | | |
|---|---|---|
| EP | 2765816 A1 | 8/2014 |
| KR | 1020130041813 A | 4/2013 |
| WO | 2013051206 A1 | 4/2013 |

OTHER PUBLICATIONS

Extended European Search Report for EP Application 17936091.2 dated Dec. 16, 2020.
International Search Report for PCT/CN2017/120125 dated Sep. 26, 2018.
3GPP TSG RAN WG1 Meeting #89; Hangzhou, China, May 15-19, 2017; R1-1707949.
3GPP TSG-RAN WG1 #89; Hangzhou, China, May 15-19, 2017; R1-1707352.
3GPP TSG-RAN WG1 #89; Hangzhou, China, May 15-19, 2017; R1-1708674.
3GPP TSG RAN WG1 Meeting NR#3, R1-1715675 Nagoya, Japan, Guangdong OPPO Mobile Telecom , Uplink power control mechanism for NR, Sep. 18-21, 2017.
Korean Office Action with English Translation for KR Application 1020207020694 dated Jul. 13, 2021. (9 pages).

* cited by examiner

200

A terminal device obtains a maximum sending power and/or TPC information corresponding to each SRS resource set in at least one SRS resource set — 210

Based on the maximum sending power and/or the TPC information corresponding to the each SRS resource set, send an SRS by adopting an SRS resource in the each SRS resource set — 220

300

A network device determines at least one piece of transmit power control (TPC) information, wherein the at least one piece of TPC information corresponds to at least one SRS resource set — 310

The network device sends the at least one piece of TPC information to a terminal device — 320

WIRELESS COMMUNICATION METHOD, TERMINAL DEVICE, AND NETWORK DEVICE

CROSS-REFERENCE TO RELATED APPLICATION(S)

This disclosure is a continuation application of International Application No. PCT/CN2017/120125, filed on Dec. 29, 2017, the entire disclosure of which is hereby incorporated by reference.

TECHNICAL FIELD

The present disclosure relates to the field of communication, and more particularly to a wireless communication method, a terminal device, and a network device.

BACKGROUND

In a New Radio (NR) system, a terminal device may be configured with a Sounding Reference Signal (SRS) resource set. The terminal device may send an SRS by utilizing an SRS resource in the SRS resource set.

In the NR system, how to perform power control, in an aspect of SRS transmission, is an urgent problem to be solved.

SUMMARY

Implementations of the present disclosure provide a wireless communication method and a device.

In a first aspect, a wireless communication method is provided, including: obtaining, by a terminal device, a maximum sending power and/or transmit power control (TPC) information corresponding to each Sounding Reference Signal (SRS) resource set in at least one SRS resource set; and based on the maximum sending power and/or the TPC information corresponding to the each SRS resource set, sending an SRS by adopting an SRS resource in the each SRS resource set.

In combination with the first aspect, in a possible implementation of the first aspect, obtaining, by the terminal device, the maximum sending power corresponding to the each SRS resource set, includes: obtaining, by the terminal device, a first maximum sending power, wherein the first maximum sending power is applicable to the each SRS resource set.

In combination with the first aspect or any above possible implementation thereof, in a possible implementation of the first aspect, obtaining, by the terminal device, the first maximum sending power, includes: according to a power level of the terminal device and/or configuration information of a network device, determining the first maximum sending power.

In combination with the first aspect or any above possible implementation thereof, in a possible implementation of the first aspect, obtaining, by the terminal device, the maximum sending power corresponding to the each SRS resource set, includes: obtaining a second maximum sending power; and determining a power value got by dividing the second maximum sending power by a specific numerical value, as the maximum sending power corresponding to the each SRS resource set, wherein the specific numerical value is greater than or equal to a quantity of SRS resource sets corresponding to the at least one SRS resource set.

In combination with the first aspect or any above possible implementation thereof, in a possible implementation of the first aspect, obtaining the second maximum sending power, includes: according to a power level of the terminal device and/or configuration information of a network device, determining the second maximum sending power.

In combination with the first aspect or any above possible implementation thereof, in a possible implementation of the first aspect, obtaining, by the terminal device, the maximum sending power corresponding to the each SRS resource set, includes: according to a power level of the terminal device and/or configuration information of a network device, respectively independently determining the maximum sending power corresponding to the each SRS resource set or each SRS resource set group.

In combination with the first aspect or any above possible implementation thereof, in a possible implementation of the first aspect, obtaining, by the terminal device, the TPC information corresponding to the each SRS resource set, includes: respectively obtaining the TPC information corresponding to the each SRS resource set from at least one signaling corresponding to the at least one SRS resource set.

In combination with the first aspect or any one of the above possible implementations thereof, in a possible implementation of the first aspect, an arrangement order of each signaling of the at least one signaling in the at least one signaling indicates a corresponding SRS resource set; or, the each signaling is associated with first indication information, wherein the first indication information is used for indicating a corresponding SRS resource set.

In combination with the first aspect or any above possible implementation thereof, in a possible implementation of the first aspect, obtaining, by the terminal device, the TPC information corresponding to the each SRS resource set, includes: respectively obtaining the TPC information corresponding to the each SRS resource set from at least one TPC information field corresponding to the at least one SRS resource set.

In combination with the first aspect or any above possible implementation thereof, in a possible implementation of the first aspect, an arrangement order of each TPC information field of the at least one TPC information field in the at least one TPC information field indicates a corresponding SRS resource set; or, the each TPC information field is associated with second indication information, wherein the second indication information is used for indicating a corresponding SRS resource set.

In combination with the first aspect or any one of the above possible implementations thereof, in a possible implementation of the first aspect, the method further includes: receiving third indication information, wherein the third indication information is used for indicating a TPC information field corresponding to the terminal device and/or a TPC information field corresponding to an SRS resource set of the terminal device.

In combination with the first aspect or any above possible implementation thereof, in a possible implementation of the first aspect, a signaling bearing the at least one TPC information domain is applicable to a terminal device group.

In combination with the first aspect or any above possible implementation thereof, in a possible implementation of the first aspect, the at least one SRS resource set corresponds to at least one antenna panel, and SRS resource sets corresponding to different panels are different.

In a second aspect, a wireless communication method is provided, including: determining, by a network device, at least one piece of transmit power control (TPC) information, wherein the at least one piece of TPC information corresponds to at least one SRS resource set; and sending, by the network device, the at least one piece of TPC information to a terminal device.

In combination with the second aspect, at least one piece of TPC information is borne in at least one signaling, and each signaling bears one piece of TPC information.

In combination with the second aspect or any above possible implementation thereof, in a possible implementation of the second aspect, an arrangement order of each signaling of the at least one signaling in the at least one signaling indicates a corresponding SRS resource set.

In combination with the second aspect or any above possible implementation thereof, in a possible implementation of the second aspect, the each signaling is associated with first indication information, wherein the first indication information is used for indicating a corresponding SRS resource set.

In combination with the second aspect or any above possible implementation thereof, in a possible implementation of the second aspect, the at least one piece of TPC information is borne in at least one TPC information field of a single signaling, wherein each TPC information field bears one piece of TPC information.

In combination with the second aspect or any above possible implementation thereof, in a possible implementation of the second aspect, an arrangement order of each TPC information field of the at least one TPC information field in the at least one TPC information field indicates a corresponding SRS resource set.

In combination with the second aspect or any above possible implementation thereof, in a possible implementation of the second aspect, the each TPC information field is associated with second indication information for indicating a corresponding SRS resource set.

In combination with the second aspect or any one of the above possible implementations thereof, in a possible implementation of the second aspect, the method further includes the terminal device receives a fifth message sent by a network device.

sending third indication information, wherein the third indication information is used for indicating a TPC information field corresponding to the terminal device and/or a TPC information field corresponding to an SRS resource set of the terminal device.

In combination with the second aspect or any above possible implementation thereof, in a possible implementation of the second aspect, the single signaling is applicable to a terminal device group.

In a third aspect, a terminal device is provided, which is used for performing the method in the above first aspect or any possible implementation of the first aspect. Specifically, the terminal device includes function modules used for executing the method in the first aspect or any possible implementation of the first aspect described above.

In a fourth aspect, a network device is provided, which is used for performing the method in the above second aspect or any possible implementation of the second aspect. Specifically, the network device includes function modules for executing the method in the second aspect or in any possible implementation of the second aspect described above.

In a fifth aspect, a terminal device is provided, which includes a processor, a memory, and a transceiver. The processor, the memory, and the transceiver communicate with each other through internal connection paths to transfer control and/or data signals, so that the terminal device implements the method in the first aspect or any possible implementation of the first aspect described above.

In a sixth aspect, a network device is provided, which includes a processor, a memory, and a transceiver. The processor, the memory, and the transceiver communicate with each other through internal connection paths to transfer control and/or data signals so that the network device executes the method in the second aspect or any possible implementation of the second aspect.

In a seventh aspect, a computer readable medium is provided, wherein the computer readable medium is used for storing a computer program, and the computer program includes instructions for executing the above method or in any possible implementation.

In an eighth aspect, a computer program product including instructions is provided, wherein when running on a computer, the computer program product causes the computer to perform the above method or the method in any possible implementation.

DETAILED DESCRIPTION

In the following, a technical solution in implementations of the present disclosure will be described in combination with drawings of the implementations of the present disclosure.

The technical solution of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

Figures 1, 2:
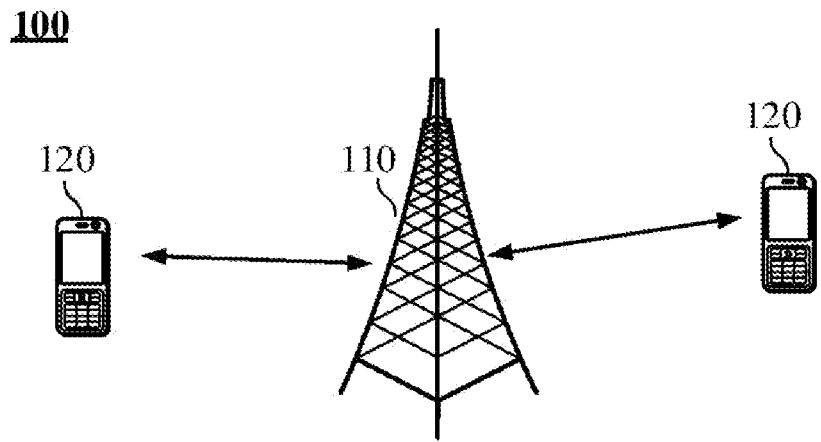
FIG. 1 is a schematic diagram of a wireless communication system according to an implementation of the present disclosure.
FIG. 2 is a schematic flowchart of a wireless communication method according to an implementation of the present disclosure.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, an on-board device, or a wearable device, a network device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, a terminal direct connection (Device to Device, D2D) communication may be performed between the terminal devices 120.

Optionally, the 5G system or network may also be referred to as a New Radio (NR) system or network.

FIG. 1 illustrates one network device and two terminal devices. Optionally, the wireless communication system 100 may include multiple network devices, and another quantity of terminal devices may be included within the coverage area of each network device, and this is not restricted in implementations of the present disclosure.

In the wireless communication system 100, the terminal device may have one or more antenna array blocks for uplink data transmission, wherein each antenna array block has an independent radio frequency channel. One Demodulation Reference Signal (DMRS) port group corresponds to one antenna array block. After determining a transmission parameter of one antenna array block, the terminal device may transmit, on the one antenna array block, data on the corresponding DMRS port group.

Optionally, the wireless communication system 100 may further include other network entities such as a network controller, a mobile management entity, and this is not restricted in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flowchart of a wireless communication method 200 according to an implementation of the present disclosure. The method 200 includes at least some of the following contents.

In 210, a terminal device obtains a maximum sending power and/or transmits power control (TPC) information corresponding to each SRS resource set in at least one SRS resource set.

Specifically, the terminal device may be configured with at least one SRS resource set. Herein, each SRS resource set may include multiple SRS resources, wherein each SRS resource may be an SRS resource with an independent configuration, and there may be independent configurations between different SRS resources. Different SRS resources may differ from each other in aspects of an SRS sending period, an SRS triggering mode, a quantity of symbols occupied by each SRS sending, etc. Herein, SRS resources in a same SRS resource set may be same in an aspect of at least one kind of configuration.

Herein, different SRS resource sets may differ in an aspect of at least one configuration, for example, in an aspect of an SRS sending period, an SRS triggering mode, or a quantity of symbols occupied by each SRS sending, etc.

Optionally, the terminal device may be configured with at least one antenna panel, wherein each antenna panel may be configured with one or more SRS resource sets for sending an SRS through the antenna panel.

Optionally, the at least one SRS resource set in 210 may correspond to one or more antenna panels, wherein SRS resource sets corresponding to different antenna panels may be same or different.

It should be understood that the at least one SRS resource set in 210 may be all SRS resource sets available to the terminal device, or may be part of SRS resource sets available to the terminal device.

For a millimeter wave NR terminal, there may be different multiple antenna panels, wherein different beamforming formed on each panel points to different directions, on which a signal may be sent simultaneously.

When multiple antenna panels exist in the terminal device, if a signal is sent simultaneously, power control is required.

In 220, based on the maximum sending power and/or the TPC information corresponding to the each SRS resource set, the terminal device adopts an SRS resource in the each SRS resource set to send an SRS.

In order to facilitate clearer understanding of the present disclosure, how to determine corresponding maximum sending powers for various SRS resource sets will be described in detail below.

In an implementation, the terminal device obtains a first maximum sending power, wherein the first maximum sending power is applicable to the each SRS resource set.

Specifically, the terminal device may determine one maximum sending power for all of at least one SRS resource set, and when the terminal device utilizes each SRS resource set in the at least one SRS resource set to send an SRS, the maximum sending power adopted is same.

Optionally, according to a power level of the terminal device and/or configuration information of a network device, the terminal device determines the first maximum sending power.

Specifically, the terminal device may determine, with reference to its own power level and at least one parameter configured by the network device, the first maximum sending power.

In an implementation, the terminal device obtains a second maximum sending power, and determines a power value got by dividing the second maximum sending power by a specific numerical value, as the maximum sending power corresponding to the each SRS resource set, wherein the specific numerical value is greater than or equal to a quantity of SRS resource sets corresponding to the at least one SRS resource set.

Herein, the specific numerical value may be equal to a quantity of antenna panels of the terminal device, and the antenna panels of the terminal device may correspond to the SRS resource sets one by one. Or, the specific quantity may be equal to a maximum SRS resource set available to the terminal device. Or, the specific quantity may be equal to a quantity of SRS resource sets available for sending through the antenna panels of the terminal device.

Optionally, according to the power level of the terminal device and/or the configuration information of the network device, the terminal device determines the second maximum sending power.

Specifically, the terminal device may determine, with reference to its own power level and at least one parameter configured by the network device, the second maximum sending power.

In another implementation, according to a power level of the terminal device and/or configuration information of a network device, the maximum sending power corresponding to the each SRS resource set or each SRS resource set group is respectively independently determined.

Herein, the each SRS resource set group may include at least one SRS resource set, wherein the at least one SRS set mentioned in 210 may belong to at least one SRS resource set group, and the terminal device may determine the maximum sending power for each SRS resource set group according to the power level of the terminal device.

In order to facilitate clearer understanding of the present disclosure, how to determine corresponding TPC for various SRS resource set will be described in detail below.

In an implementation, the TPC information corresponding to the each SRS resource set is respectively obtained from at least one signaling corresponding to the at least one SRS resource set.

Herein, the at least one signaling may correspond to the at least one SRS resource set one by one, wherein each signaling may bear TPC information corresponding to a SRS resource set corresponding to the each signaling.

Herein, the network device may send at least one signaling in each sending period, and the signaling for determining TPC information corresponding to at least one SRS resource set may belong to a same sending period or different sending periods.

Optionally, the signaling mentioned in the implementation of the present disclosure may be a physical layer signaling, or Downlink Control Information (DCI), or of course, it may be another signaling.

Optionally, the network device may implicitly or explicitly indicate SRS resource sets corresponding to various signalings.

Optionally, an arrangement order of each signaling of the at least one signaling in the at least one signaling indicates a corresponding SRS resource set.

For example, there are 4 signalings, the first signaling may correspond to an SRS resource set 1, the second signaling may correspond to an SRS resource set 2, the third signaling may correspond to an SRS resource set 3, and the fourth signaling may correspond to an SRS resource set 4.

Optionally, the each signaling is associated with first indication information, wherein the first indication information is used for indicating a corresponding SRS resource set.

Specifically, the each signaling may include first indication information, wherein the first indication information is used for indicating a corresponding SRS resource set.

In an implementation, the TPC information corresponding to the each SRS resource set is respectively obtained from at least one TPC information domain corresponding to the at least one SRS resource set.

Herein, the at least one information domain may belong to a same signaling or different signalings.

Optionally, the network device may implicitly or explicitly indicate SRS resource sets corresponding to various information domains.

Optionally, an arrangement order of each TPC information field of the at least one TPC information field in the at least one TPC information field indicates a corresponding SRS resource set.

For example, the network device sends a TPC command to the terminal device through DCI. There are K TPC fields in this piece of DCI, then the field 1 corresponds to a set 1, the field 2 corresponds to a set 2, . . . , and the field K corresponds to a set K.

For example, there are 4 information fields, the first information field may correspond to an SRS resource set 1, the second information field may correspond to an SRS resource set 2, the third information field may correspond to an SRS resource set 3, and the fourth information field may correspond to an SRS resource set 4.

Optionally, the each TPC information field is associated with second indication information, wherein the second indication information is used for indicating a corresponding SRS resource set.

Specifically, the each TPC information field may include second indication information, wherein the second indication information is used for indicating a corresponding SRS resource set.

For example, the network device sends a TPC command to a UE through DCI. In this piece of DCI, there are M (M<=K) fields, wherein each field contains a TPC field and meanwhile is associated with a reference number k of one set. Herein, M may be preset on the terminal device or determined through a configuration by a network high layer.

Optionally, a signaling bearing the at least one TPC information domain is applicable to a terminal device group.

Optionally, the terminal device receives third indication information sent by the network device, wherein the third indication information is used for indicating a TPC information field corresponding to the terminal device and/or a TPC information field corresponding to an SRS resource set of the terminal device.

Specifically, the network device may indicate, in the third indication information, to various terminal devices of multiple terminal devices, which are their corresponding information domains, or indicate, to a single terminal device, a corresponding relationship between the SRS resource set of the single terminal device and the TPC information domain.

For example, the network device sends a TPC instruction to a group of UEs through DCI, wherein multiple pieces of TPC information are contained, different pieces of TPC information may belong to different UEs, or different SRS resource sets of a same UE.

Herein, the network device configures, for a UE, reference numbers of TPC information in DCI corresponding to the SRS resource set k of the UE through a high layer signaling at the same time.

Therefore, in the implementation of the present disclosure, the terminal device obtains a corresponding maximum sending power and/or transmission power control (TPC) information for each SRS resource set in at least one SRS resource set, which can realize power control in an aspect of SRS transmission. In addition, when multi-antenna panels are used and each panel corresponds to a different SRS resource set, power control of simultaneous SRS sending by multiple panels can be realized, and uplink interference can be reduced.

Figures 3, 4:
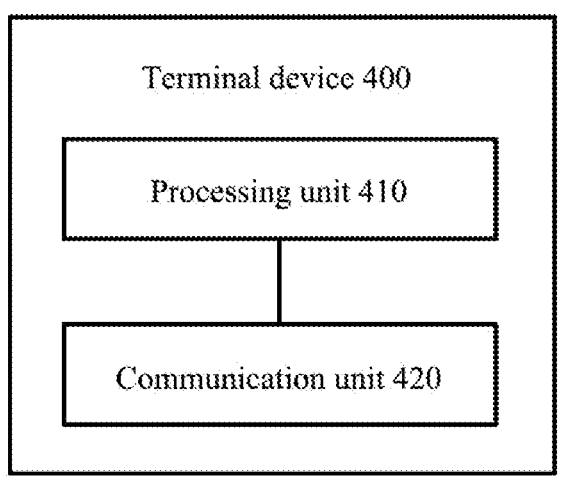
FIG. 3 is a schematic flowchart of a wireless communication method according to an implementation of the present disclosure.
FIG. 4 is a schematic block diagram of a terminal device according to an implementation of the present disclosure.

FIG. 3 is a schematic flowchart of a wireless communication method 300 according to an implementation of the present disclosure. The method 300 includes at least some of the following contents.

In 310, a network device determines at least one piece of TPC information, wherein the at least one piece of TPC information corresponds to at least one SRS resource set.

In 320, the network device sends the at least one piece of TPC information to a terminal device.

Optionally, the at least one piece of TPC information is borne in at least one signaling, wherein each signaling bears one piece of TPC information.

Optionally, an arrangement order of each signaling of the at least one signaling in the at least one signaling indicates a corresponding SRS resource set.

Optionally, the each signaling is associated with first indication information, wherein the first indication information is used for indicating a corresponding SRS resource set.

Optionally, the at least one piece of TPC information is borne in at least one TPC information field of a single signaling, wherein each TPC information field bears one piece of TPC information.

Optionally, an arrangement order of each TPC information field of the at least one TPC information field in the at least one TPC information field indicates a corresponding SRS resource set.

Optionally, the each TPC information field is associated with second indication information, wherein the second indication information is used for indicating a corresponding SRS resource set.

Optionally, the network device sends third indication information, wherein the third indication information is used for indicating a TPC information field corresponding to the terminal device and/or a TPC information field corresponding to an SRS resource set of the terminal device.

Optionally, the single signaling is applicable to a terminal device group.

FIG. 4 is a schematic block diagram of a terminal device 400 according to an implementation of the present disclosure. As shown in FIG. 4, the terminal device 400 includes a processing unit 410 and a communication unit 420.

The processing unit 410 is configured to obtain a maximum sending power and/or transmit power control (TPC) information corresponding to each Sounding Reference Signal (SRS) resource set in at least one SRS resource set; and the communication unit 420 is configured to adopt, based on the maximum sending power and/or the TPC information corresponding to the each SRS resource set, an SRS resource in the each SRS resource set to send an SRS.

Optionally, the processing unit 410 is further configured to: obtain a first maximum sending power, wherein the first maximum sending power is applicable to the each SRS resource set.

Optionally, the processing unit 410 is further configured to: determine, according to a power level of the terminal device and/or configuration information of a network device, the first maximum sending power.

Optionally, the processing unit 410 is further configured to: obtain a second maximum sending power; and determine a power value got by dividing the second maximum sending power by a specific numerical value, as the maximum sending power corresponding to the each SRS resource set, wherein the specific numerical value is greater than or equal to a quantity of SRS resource sets corresponding to the at least one SRS resource set.

Optionally, the processing unit 410 is further configured to: determine, according to a power level of the terminal device and/or configuration information of a network device, the second maximum sending power.

Optionally, the processing unit 410 is further configured to: respectively independently determine, according to a power level of the terminal device and/or configuration information of a network device, a maximum sending power corresponding to the each SRS resource set or each SRS resource set group.

Optionally, the processing unit 410 is further configured to: respectively obtain the TPC information corresponding to the each SRS resource set from at least one signaling corresponding to the at least one SRS resource set.

Optionally, an arrangement order of each signaling of the at least one signaling in the at least one signaling indicates a corresponding SRS resource set; or, the each signaling is associated with first indication information, wherein the first indication information is used for indicating a corresponding SRS resource set.

Optionally, the processing unit 410 is further configured to: respectively obtain the TPC information corresponding to the each SRS resource set from at least one TPC information field corresponding to the at least one SRS resource set.

Optionally, an arrangement order of each TPC information field of the at least one TPC information field in the at least one TPC information field indicates a corresponding SRS resource set; or, the each TPC information field is associated with second indication information, wherein the second indication information is used for indicating a corresponding SRS resource set.

Optionally, the communication unit 420 is further configured to: receive third indication information, wherein the third indication information is used for indicating a TPC information field corresponding to the terminal device and/or a TPC information field corresponding to an SRS resource set of the terminal device.

Optionally, a signaling bearing the at least one TPC information domain is applicable to a terminal device group.

Optionally, the at least one SRS resource set corresponds to at least one antenna panel, and SRS resource sets corresponding to different panels are different.

It should be understood that the terminal device 400 according to an implementation of the present disclosure may correspond to the terminal device in the method 300 of the present disclosure, and the above-mentioned and other operations and/or functions of various units in the terminal device 400 are respectively for realizing the corresponding processes of the terminal device in the method 200 shown in FIG. 2, and this will not be repeated here for sake of conciseness.

Figure 5:
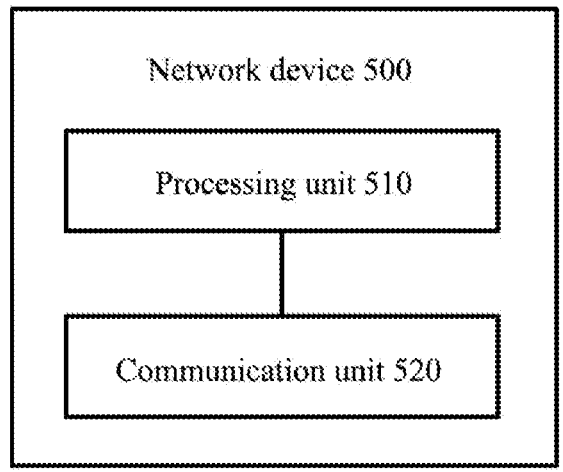
FIG. 5 is a schematic block diagram of a network device according to an implementation of the present disclosure.

FIG. 5 is a schematic block diagram of a network device 500 according to an implementation of the present disclosure. As shown in FIG. 5, the network device 500 includes a processing unit 510 and a communication unit 520; the processing unit 510 is configured to determine at least one piece of transmit power control (TPC) information, wherein the at least one piece of TPC information corresponds to at least one SRS resource set; and the communication unit 520 is configured to send the at least one piece of TPC information to a terminal device.

Optionally, the at least one piece of TPC information is borne in at least one signaling, wherein each signaling bears one piece of TPC information.

Optionally, an arrangement order of each signaling of the at least one signaling in the at least one signaling indicates a corresponding SRS resource set.

Optionally, the each signaling is associated with first indication information, wherein the first indication information is used for indicating a corresponding SRS resource set.

Optionally, the at least one piece of TPC information is borne in at least one TPC information field of a single signaling, wherein each TPC information field bears one piece of TPC information.

Optionally, an arrangement order of each TPC information field of the at least one TPC information field in the at least one TPC information field indicates a corresponding SRS resource set.

Optionally, the each TPC information field is associated with second indication information, wherein the second indication information is used for indicating a corresponding SRS resource set.

Optionally, the communication unit 520 is further configured to: send third indication information, wherein the third indication information is used for indicating a TPC information field corresponding to the terminal device and/or a TPC information field corresponding to an SRS resource set of the terminal device.

Optionally, the single signaling is applicable to a terminal device group.

It should be understood that the device 500 for transmitting data according to an implementation of the present disclosure may correspond to the terminal device in the method implementations of the present disclosure, and the above-mentioned and other operations and/or functions of various units in the device 500 are respectively for realizing the corresponding processes of the terminal device in the method 300 shown in FIG. 3, and this will not be repeated here for sake of conciseness.

Figure 6:
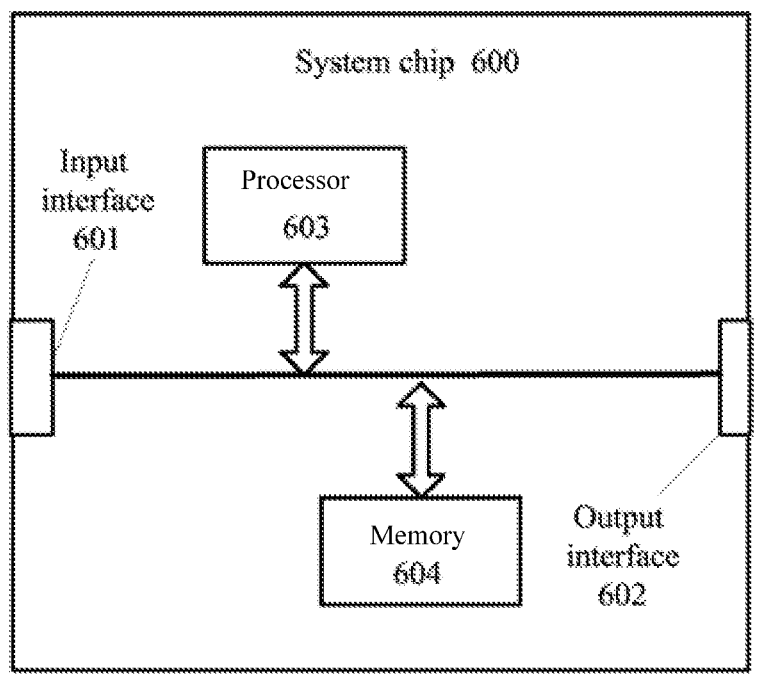
FIG. 6 is a schematic diagram of a system chip according to an implementation of the present disclosure.

FIG. 6 is a schematic structural diagram of a system chip 600 according to an implementation of the present disclosure. The system chip 600 of FIG. 6 includes an input interface 601, an output interface 602, a processor 603 and a memory 604, which may be connected from each other through an internal communication connection line, wherein the processor 603 is configured to execute codes in the memory 604.

Optionally, when the codes are executed, the processor 603 implements the method executed by the terminal device in the method implementation. For the sake of conciseness, it will not be repeated here.

Optionally, when the codes are executed, the processor 603 implements the method performed by a network device in the method implementation. For the sake of conciseness, it will not be repeated here.

Figure 7:
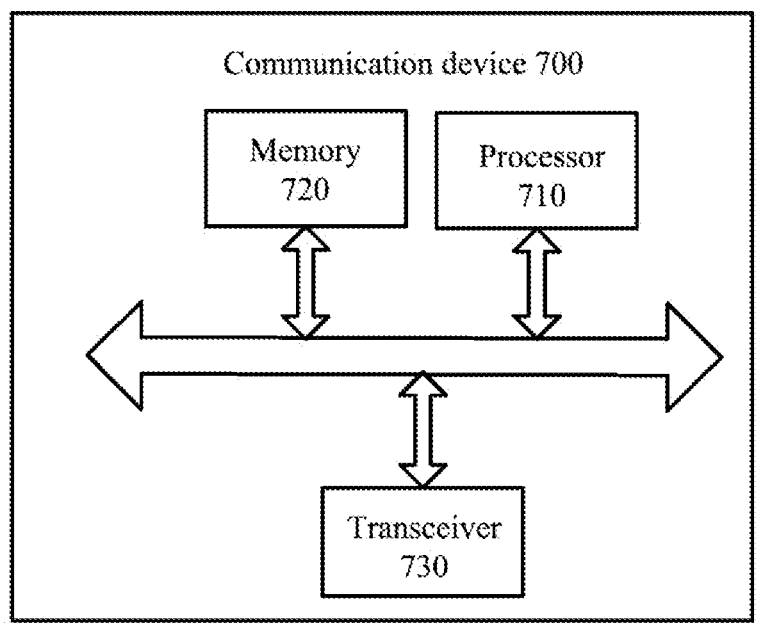
FIG. 7 is a schematic block diagram of a communication device according to an implementation of the present disclosure.

FIG. 7 is a schematic block diagram of a communication device 700 according to an implementation of the present disclosure. As shown in FIG. 7, the communication device 700 includes a processor 710 and a memory 720. The memory 720 may store program codes, and the processor 710 may execute the program codes stored in the memory 720.

Optionally, as shown in FIG. 7, the communication device 700 may include a transceiver 730, and the processor 710 may control the transceiver 730 to communicate externally.

Optionally, the processor 710 may call the program codes stored in the memory 720 to perform corresponding operations of the terminal device in the method implementations, which will not be described here repeatedly for brevity.

Optionally, the processor 710 may call the program codes stored in the memory 720 to perform corresponding operations of the network device in the method implementations, which will not be described here repeatedly for brevity.

It should be understood that the processor in an implementation of the present disclosure may be an integrated circuit chip with a capability for processing signals. In the implementation process, the actions of the method implementations described above may be accomplished by integrated logic circuits of hardware in the processor or instructions in the form of software. The above processor may be a general purpose processor, a digital signal processor (DSP), a disclosure specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor, or the processor may be any conventional processor or the like. The actions of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

Those of ordinary skill in the art will recognize that the example elements and algorithm acts described in combination with the implementations disclosed herein can be implemented in electronic hardware, or a combination of computer software and electronic hardware. Whether these functions are implemented in hardware or software depends on the specific disclosure and design constraints of the technical solution. Skilled artisans may use different methods to implement the described functions in respect to each particular disclosure, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed system, apparatus and method may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for wireless communication, comprising:
    obtaining, by a terminal device, at least one of a maximum sending power or Transmit Power Control (TPC) information corresponding to each Sounding Reference Signal (SRS) resource set in at least one SRS resource set; and
    based on the at least one of the maximum sending power or the TPC information corresponding to the each SRS resource set, sending an SRS by adopting an SRS resource in the each SRS resource set,
    wherein obtaining, by the terminal device, the maximum sending power corresponding to the each SRS resource set, comprises:
        obtaining a second maximum sending power; and
        determining a power value got by dividing the second maximum sending power by a specific numerical value, as the maximum sending power corresponding to the each SRS resource set, wherein the specific numerical value is greater than or equal to a quantity of SRS resource sets corresponding to the at least one SRS resource set.

2. The method according to claim 1, wherein obtaining, by the terminal device, the maximum sending power corresponding to the each SRS resource set, comprises:
    obtaining, by the terminal device, a first maximum sending power, wherein the first maximum sending power is applicable to the each SRS resource set.

3. The method according to claim 2, wherein obtaining, by the terminal device, the first maximum sending power, comprises:
    according to at least one of a power level of the terminal device or configuration information of a network device, determining the first maximum sending power.

4. The method according to claim 1, wherein obtaining the second maximum sending power, comprises:
    according to at least one of a power level of the terminal device or configuration information of a network device, determining the second maximum sending power.

5. The method according to claim 1, wherein obtaining, by the terminal device, the maximum sending power corresponding to the each SRS resource set, comprises:
    according to at least one of a power level of the terminal device or configuration information of a network device, respectively independently determining the maximum sending power corresponding to the each SRS resource set or each SRS resource set group.

6. The method according to claim 1, wherein obtaining, by the terminal device, the TPC information corresponding to the each SRS resource set, comprises:
    respectively obtaining the TPC information corresponding to the each SRS resource set from at least one signaling corresponding to the at least one SRS resource set.

7. A terminal device, comprising a processor, a memory, and a transceiver, wherein the processor, the memory, and the transceiver communicate with each other through internal connection paths to transfer at least one of control or data signals, the memory stores codes, and the processor is configured to execute the codes in the memory to:
    obtain at least one of a maximum sending power or Transmit Power Control (TPC) information corresponding to each Sounding Reference Signal (SRS) resource set in at least one SRS resource set; and
    send, through the transceiver, an SRS by adopting an SRS resource in the each SRS resource set based on the at least one of the maximum sending power or the TPC information corresponding to the each SRS resource set,
    wherein the processor is further configured to:
    obtain a second maximum sending power; and
    determine a power value got by dividing the second maximum sending power by a specific numerical value, as the maximum sending power corresponding to the each SRS resource set, wherein the specific numerical value is greater than or equal to a quantity of SRS resource sets corresponding to the at least one SRS resource set.

8. The terminal device according to claim 7, wherein the processor is further configured to:
obtain a first maximum sending power, wherein the first maximum sending power is applicable to the each SRS resource set.

9. The terminal device according to claim 8, wherein the processor is further configured to:
determine, according to at least one of a power level of the terminal device or configuration information of a network device, the first maximum sending power.

10. The terminal device according to claim 7, wherein the processor is further configured to:
determine, according to at least one of a power level of the terminal device or configuration information of a network device, the second maximum sending power.

11. The terminal device according to claim 7, wherein the processor is further configured to:
respectively independently determine, according to at least one of a power level of the terminal device or configuration information of a network device, the maximum sending power corresponding to the each SRS resource set or each SRS resource set group.

12. The terminal device according to claim 7, wherein the processor is further configured to:
respectively obtain the TPC information corresponding to the each SRS resource set from at least one signaling corresponding to the at least one SRS resource set.

13. The terminal device according to claim 12, wherein an arrangement order of each signaling of the at least one signaling in the at least one signaling indicates a corresponding SRS resource set; or,
the each signaling is associated with first indication information for indicating a corresponding SRS resource set.

14. The terminal device according to claim 7, wherein the processor is further configured to:
respectively obtain the TPC information corresponding to the each SRS resource set from at least one TPC information field corresponding to the at least one SRS resource set.

15. The terminal device according to claim 14, wherein an arrangement order of each TPC information field of the at least one TPC information field in the at least one TPC information field indicates a corresponding SRS resource set; or,
the each TPC information field is associated with second indication information for indicating a corresponding SRS resource set.

16. The terminal device according to claim 14, wherein the processor is further configured to:
receive, through the transceiver, third indication information, wherein the third indication information is used for indicating at least one of: a TPC information field corresponding to the terminal device or a TPC information field corresponding to an SRS resource set of the terminal device.

17. The terminal device according to claim 14, wherein a signaling bearing the at least one TPC information field is applicable to a terminal device group.

18. The terminal device according to claim 7, wherein the at least one SRS resource set corresponds to at least one antenna panel, and SRS resource sets corresponding to different panels are different.

* * * * *